United States Patent [19]
Wischermann

[11] Patent Number: 5,589,887
[45] Date of Patent: Dec. 31, 1996

[54] METHOD AND CIRCUIT FOR DETECTING AND CONCEALING VIDEO SIGNAL ERRORS

[75] Inventor: Gerhard Wischermann, Weiterstadt, Germany

[73] Assignee: U.S. Philips Corporation, New York, N.Y.

[21] Appl. No.: 526,808

[22] Filed: Sep. 11, 1995

[30] Foreign Application Priority Data

Sep. 15, 1994 [DE] Germany .......................... 44 32 787.0

[51] Int. Cl.⁶ .................................... H04N 5/21
[52] U.S. Cl. .................... 348/616; 348/96; 382/275
[58] Field of Search ...................................... 348/607, 615, 348/576, 97, 98, 616, 625; 382/266, 275, 262, 263, 264; H04N 5/21, 5/213, 5/217, 5/253, 5/257

[56] References Cited

U.S. PATENT DOCUMENTS

| | | | |
|---|---|---|---|
| 4,941,186 | 7/1990 | Massmann et al. | 348/616 |
| 5,097,521 | 3/1992 | Massmann | 348/607 |

FOREIGN PATENT DOCUMENTS

| | | | |
|---|---|---|---|
| 4343095 | 6/1995 | Germany | H04N 5/21 |
| 2140245 | 11/1984 | United Kingdom | H04N 3/36 |

*Primary Examiner*—Micheal H. Lee
*Attorney, Agent, or Firm*—Edward W. Goodman

[57] ABSTRACT

In a method and a circuit for detecting and concealing video signal errors caused by vertically extending film scratches during television film scanning, an error signal is derived at error locations generated by disturbed pixels and is used in the form of a control signal for concealing errors in the video signal. The error signal is generated only when an adjustable, locally bounded scratch width in the horizontal direction is not exceeded and when each scratch essentially extends vertically, and when the scratch length substantially corresponds to the film frame height. Finally, the disturbed locations in the video signal are replaced by the corresponding low-pass-filtered video signal with the aid of the error signal.

12 Claims, 7 Drawing Sheets

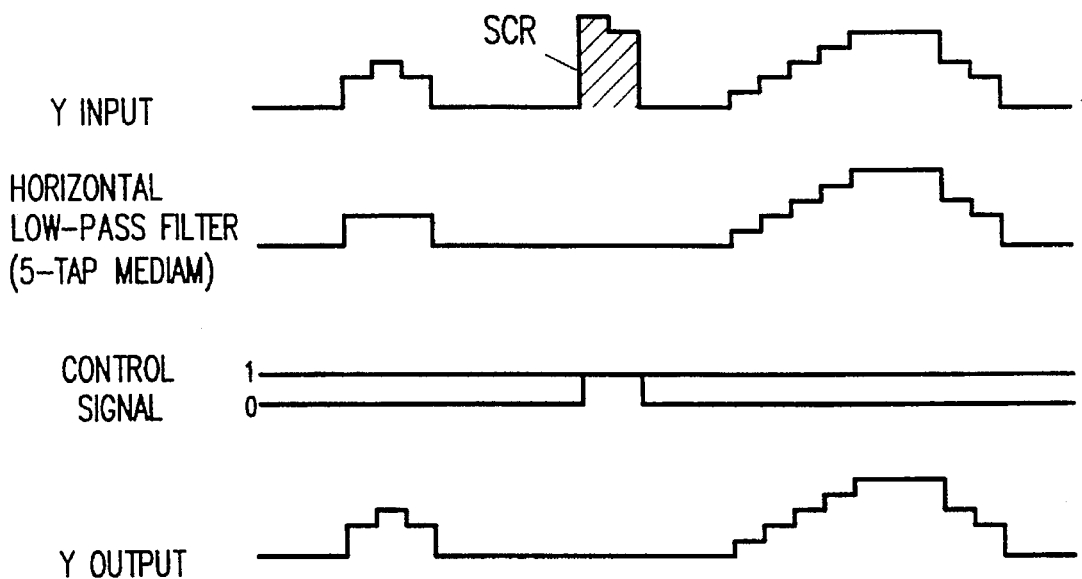
FIG. 3
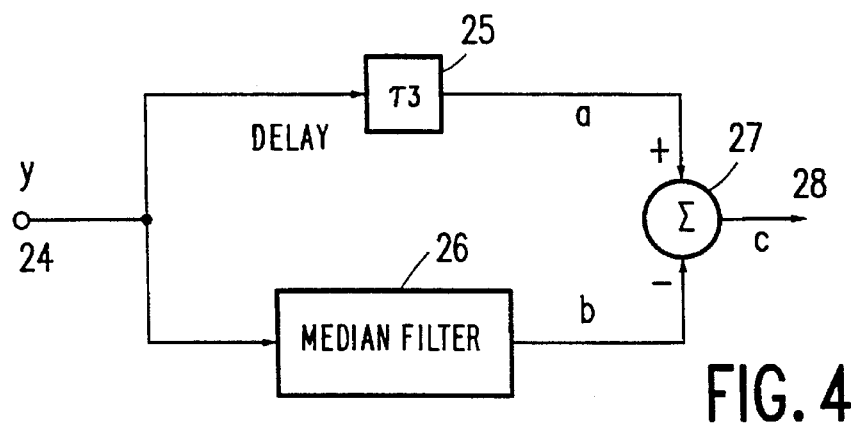
FIG. 4
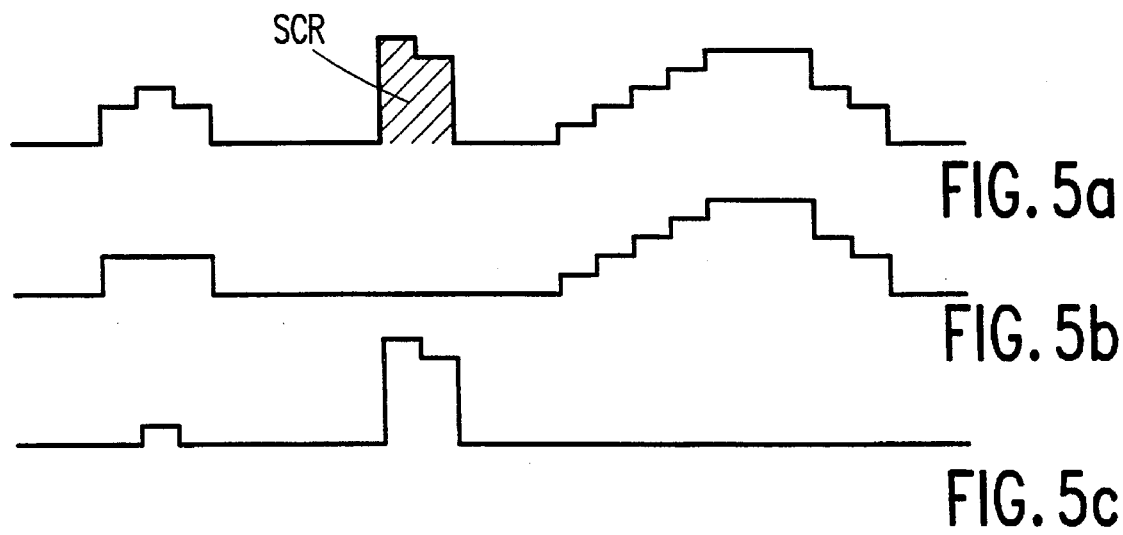
FIG. 5a
FIG. 5b
FIG. 5c

3-TAP MEDIAN FILTER

1

METHOD AND CIRCUIT FOR DETECTING AND CONCEALING VIDEO SIGNAL ERRORS

BACKGROUND OF THE INVENTION

1. Field of the Invention

The invention relates to a method of detecting and concealing video signal errors, caused by vertically extending film scratches, during television film scanning, in which an error signal is derived at error locations generated by disturbed pixels, and is used in the form of a control signal for concealing errors in the video signal.

Older, frequently used films often show two kinds of errors in the image area: dirt and dust on the surface of the film, and scratches in the running direction of the film, referred to as running scratches, which are caused by mechanical contact between the film-guiding elements and the image area. These errors, appearing as white spots or scratches, are particularly disturbing in electronic scanning and reversal of negative films.

2. Description of the Related Art

German Patent Application P 43 43 095.3 describes a method of concealing dust and scratches in connection with electronic film scanning. By means of temporally adaptive median filtering, film dust and coarse film dirt, as well as scratches accidentally spread across the film image, can be effectively filtered out in so far as they do not occur at the same location in consecutive film frames.

SUMMARY OF THE INVENTION

In contrast, it is an object of the present invention to provide a method of the type described in the opening paragraph in which stationary, vertically extending scratches which may also extend across a plurality of film frames can be effectively concealed.

This object is solved in that the error signal is generated only when an adjustable, locally bounded scratch width in the horizontal direction is not exceeded and when each scratch essentially extends vertically, and when the scratch length substantially corresponds to the film frame height, and in that the disturbed locations in the video signal are replaced by the corresponding low-pass-filtered video signal with the aid of the error signal.

The method according to the invention, has the advantage that both fine scratches on the film surface and deep scratches penetrating the color coating of the film can be concealed in such a way that no disturbances are visible at these locations in the image displayed.

These and other aspects of the invention will be apparent from and elucidated with reference to the embodiments described hereinafter.

BRIEF DESCRIPTION OF THE DRAWINGS

In the drawings:

FIG. 3 shows time diagrams to explain the scratch concealment;

FIG. 4 shows the horizontal high-pass filter of FIG. 1;

FIGS. 5a–5c show time diagrams of the signals occurring in FIG. 4;

DESCRIPTION OF THE PREFERRED EMBODIMENT

Figure 1:
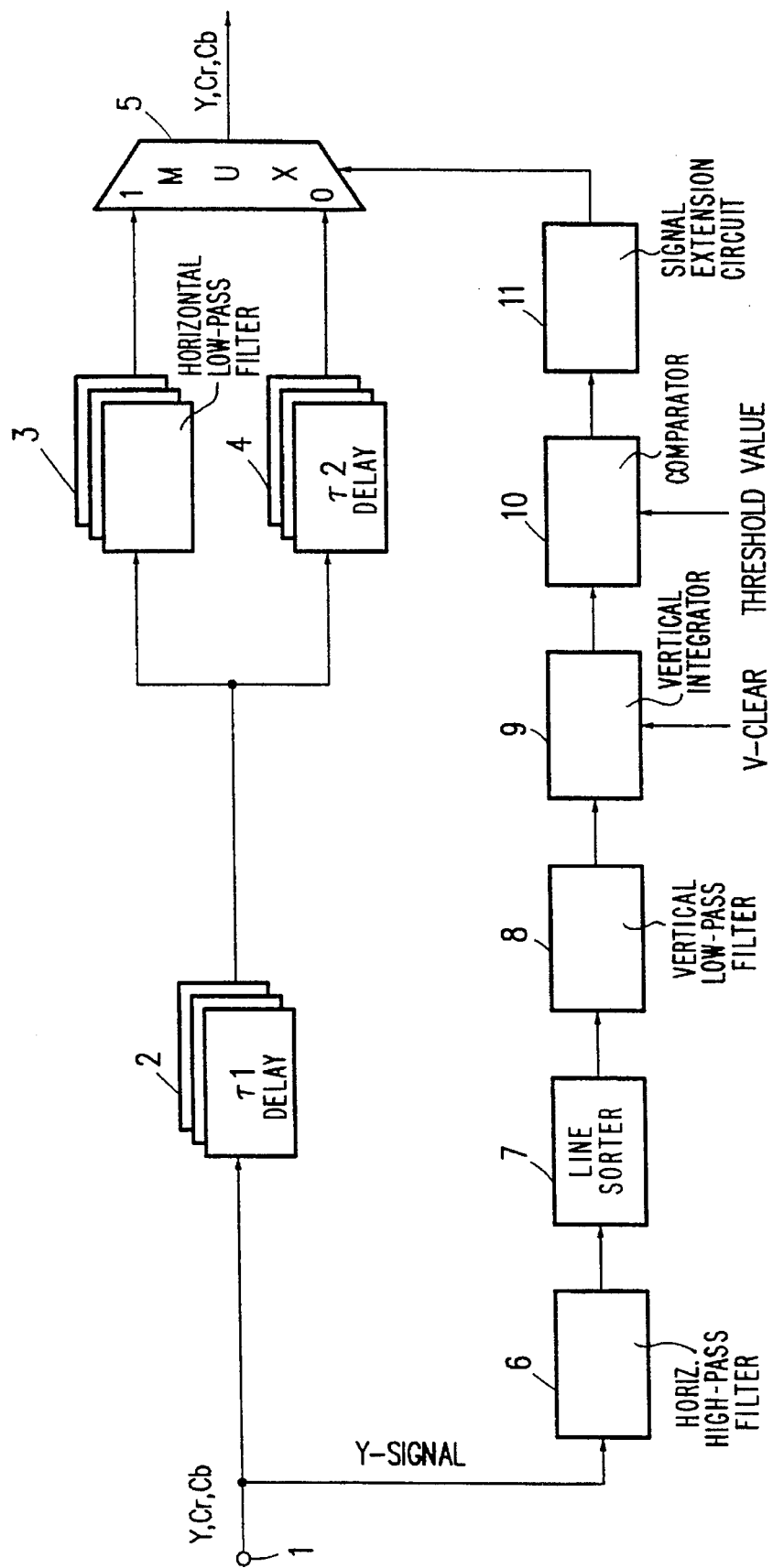
FIG. 1 is a block diagram showing the circuits for performing the method according to the invention.

FIG. 1 shows a circuit for performing the method according to the invention. The upper path represents the main signal path in which the preferably digital component signals Y, Cr, Cb supplied via input 1 are processed in an identical manner. These signals are first applied via a delay device 2 to a horizontal low-pass filter 3 and to a further delay device 4 used for delay compensation for the filter 3. The output signals of the filter 3 and of the delay device 4 are then each applied to an input of a multiplexer 5, while the video signals which are free from error locations can be taken off its output.

In the lower path, a control signal is derived from the luminance signal Y in a plurality of processing steps, which control signal marks the horizontal location of one or more film scratches. At these marked locations, the disturbed pixels are replaced in the main signal path by the output values of the low-pass filter 3 operating in the horizontal direction. The horizontal low-pass filter 3 may be implemented as a transversal filter or, according to FIG. 2, as a median filter.

Figure 2:
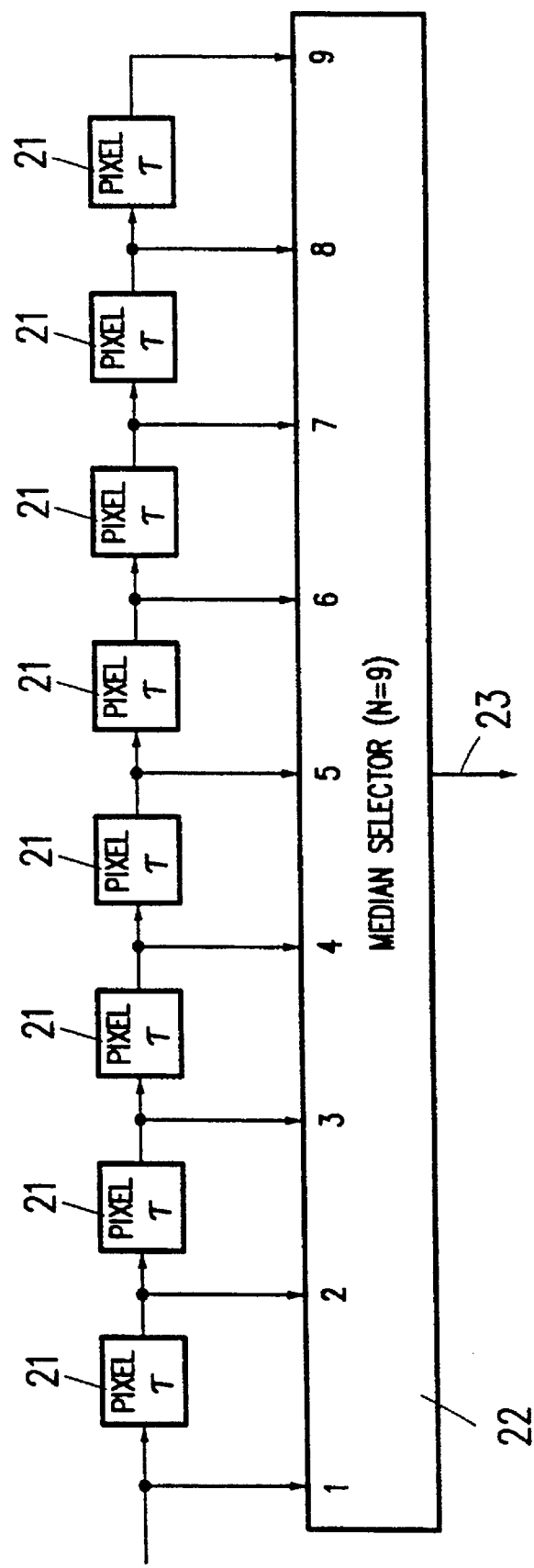
FIG. 2 shows the median filter used as a horizontal low-pass filter in FIG. 1.

The median filter 3, according to FIG. 1 and shown in FIG. 2, comprises eight pixel delay devices 21 having nine taps which are connected to the nine inputs of a median selector 22. The horizontal median-filtered video signal can then be taken off the output 23 of the median selector 22. The length of the filter or the required number of filter taps depends on the width of the scratches to be expected. With N=9 taps up to (N−1)/2=4 pixel-wide disturbances can be suppressed by means of the median filter. At a scanning frequency of 13.5 MHz, this corresponds to a duration of 300 ns which is quite sufficient in practice. It is sensible to adapt the filter length to the maximum scratch width so as to minimize the horizontal loss of resolution in the surroundings of the scratch.

FIG. 3 shows time diagrams, for example, for the luminance signal Y so as to elucidate the scratch concealment. This signal Y is disturbed, for example, in the center of the line, by a scratch SCR which is two clock pulses wide, which is detected by the control signal with a "1-pulse" generated in the scratch recognition circuit described below. By means of the multiplexer 5 in FIG. 1, the output values of the horizontal low-pass filter 3 are added at this location, which low-pass filter is implemented in this embodiment as a median filter having five taps. The output signal Y is free from disturbance at this location without details being lost in other areas.

The following description will deal with the way in which the control signal is derived, in which first the luminance signal Y in FIG. 1 is applied to a horizontal high-pass filter 6 so as to extract all perpendicular structures having a small pulse width from the video signal. The vertical extension of the scratch is determined by means of the line sorter 7 and the vertical low-pass filter 8. Subsequently, the mean value is formed for all lines of a frame by means of a vertical integrator 9 so as to extract the scratch information. In this way, residual image information components and superimposed noise can be averaged out. Positive or negative threshold values for the occurrence of white or black scratches can be defined in the subsequent comparator circuit 10. The output signal of the comparator circuit is finally applied to a signal extension circuit 11, while the control signal for controlling the multiplexer 5 can be taken off its output.

Since high-pass filtering is known to be possible by subtraction of a complementary low-pass-filtered input signal from an unfiltered input signal (having the same delay), a median filter having a high-pass character and realized in this way is shown in FIG. 4. In contrast to linear transversal or recursive filtering, which can be mathematically described with a transfer function, a high-pass filter having a median character can only be realized in this way. The luminance signal Y is thus applied via an input 24 to a delay device 25 and to a median filter 26 whose output signals are applied to a subtraction circuit 27. A median-filtered luminance signal can thus be taken off output 28.

FIGS. 5a–5c show the signals a, b, c processed in accordance with FIG. 4. As can easily be seen, the advantage of median high-pass filtering is apparent in this case because the difference signal c represents an exact image of the scratch without any pulse distortion. The first criterion for a scratch, namely the pulse width, is checked with this high-pass filtering. If the median filter window covers five pixels, pulses having a maximum width of two pixels are passed unchanged.

Figure 6:
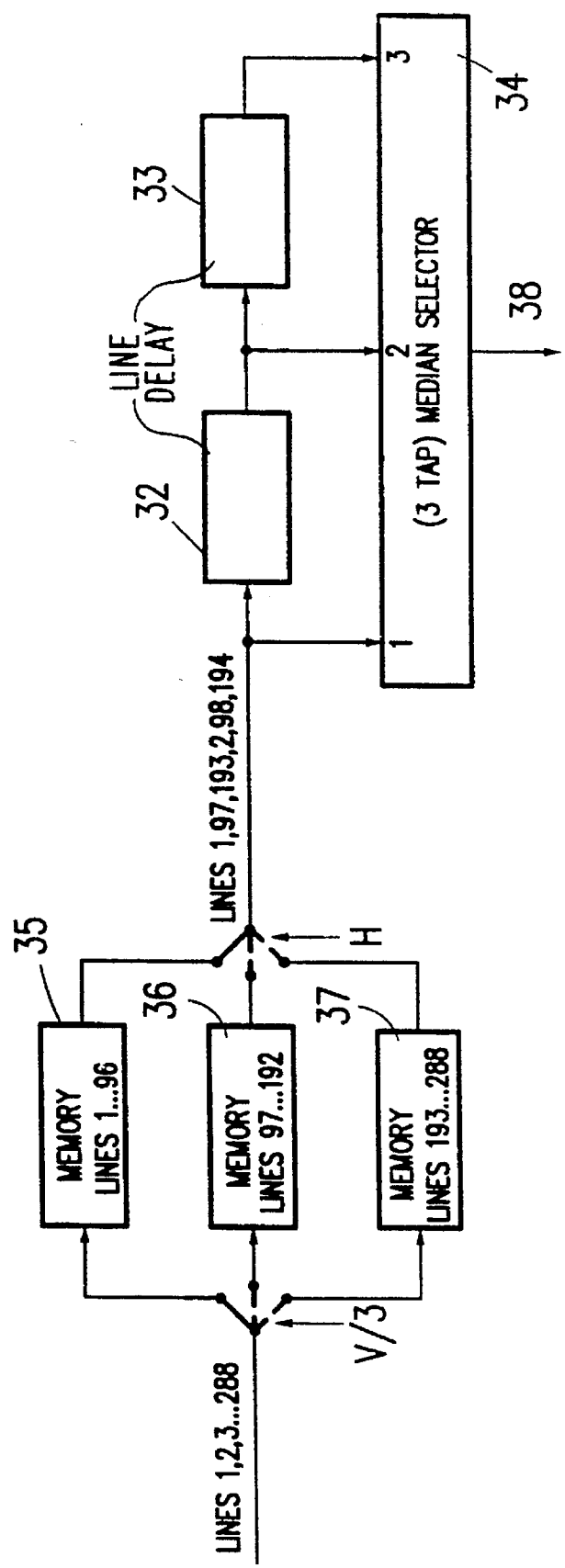
FIG. 6 shows the vertical low-pass filter with line sorter of FIG. 1.

The second feature of a scratch is its essentially perpendicular extension. In accordance with FIG. 1, this criterion is checked by means of the subsequent line sorter 7 in connection with the vertical low-pass filter 8. In FIG. 6, a median filter 31 having three taps of two line delay devices 32, 33 is used in connection with a median selector 34 which is preceded by three memory banks 35, 36, 37 for sorting the lines. The upper third part of a frame is written into the first memory bank 35, the middle third is written into the second memory bank 36 and the lower third of the frame is written into the third memory bank 37. During reading, the memory bank is cyclically changed after each line. The median filter 31 thus receives the lines in the sequence 1, 97, 193, 2, 98, 194 etc. The delays between the three taps of the median filter 31 thus each cover a third part of the active frame.

Figure 7:
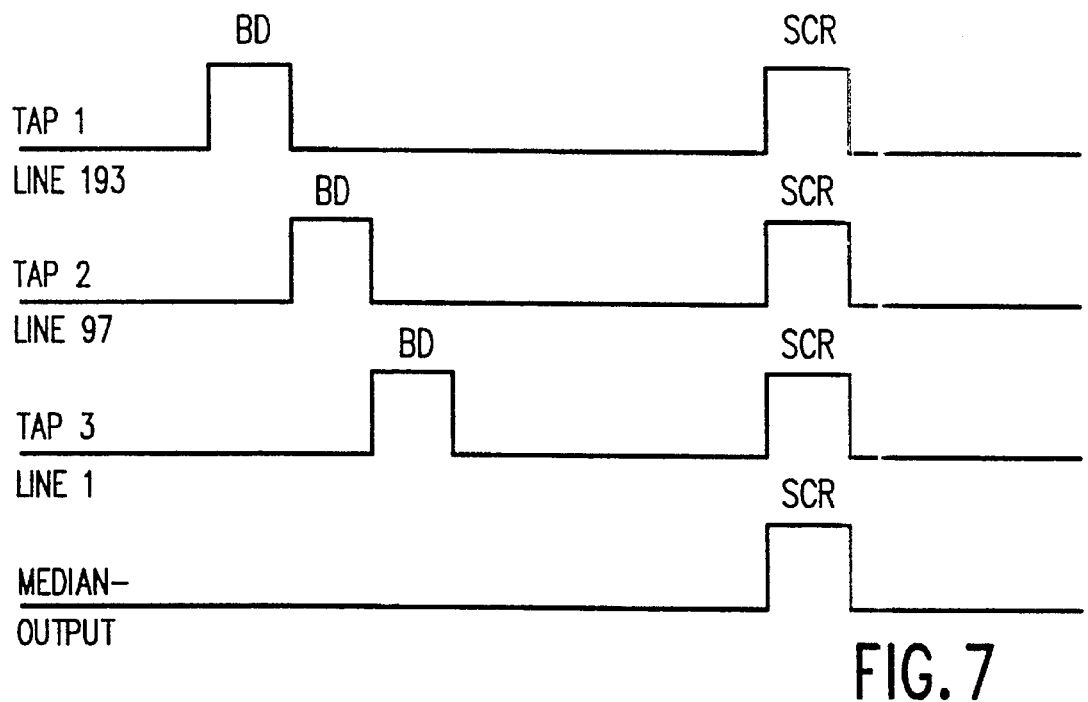
FIG. 7 shows time diagrams of the signals occurring in FIG. 6.

The time diagrams in FIG. 7 show that a real scratch (that is, a perpendicular scratch) can pass the median filter 31 unhindered, whereas a scratch-like image detail BD is already completely suppressed because of its slightly oblique position so that only the error signal SCR can be taken off the output 38 of the median filter 31.

The third feature of a potential scratch, namely the longitudinal extension is also checked by means of the vertical median filter 31. Since a median filtering operation represents the result of a majority decision, to a certain extent, narrow, perpendicular structures are shortened if their length is smaller than half the frame height, whereas they are lengthened if their length exceeds half the frame height.

Figure 8A:
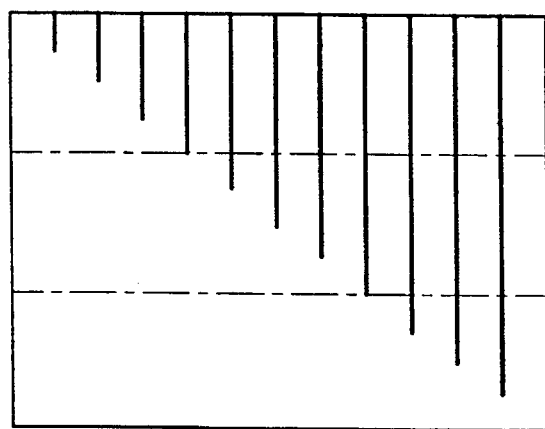
FIGS. 8a and 8b show a first graphic representation of the mode of operation of the vertical low-pass filter shown in FIG. 6.
Figure 8B:
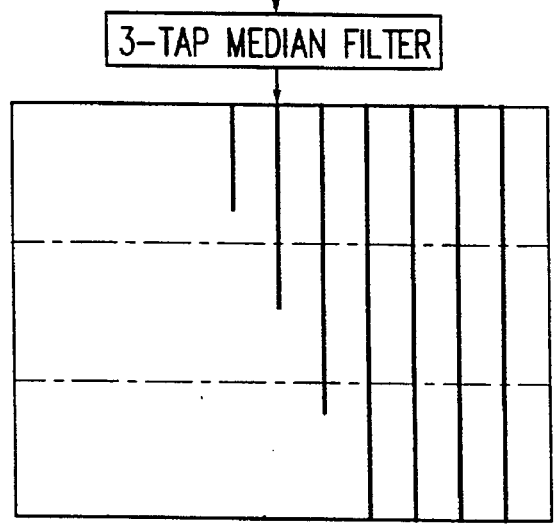

FIGS. 8a and 8b graphically shows this behavior. Structures which are shorter than one-third of the frame height are completely suppressed, see the first four perpendicular stripes in FIG. 8a, whereas structures which are longer than two-thirds of the frame height are expanded throughout the length, see the last four perpendicular stripes.

Figure 9A:
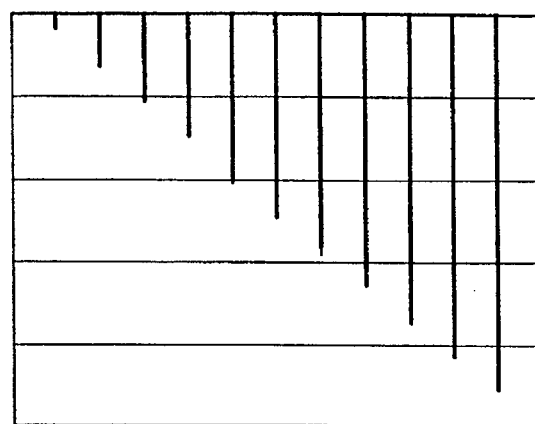
FIGS. 9a and 9b show a second graphic representation of the mode of operation of the vertical low-pass filter shown in FIG. 6.
Figure 9B:
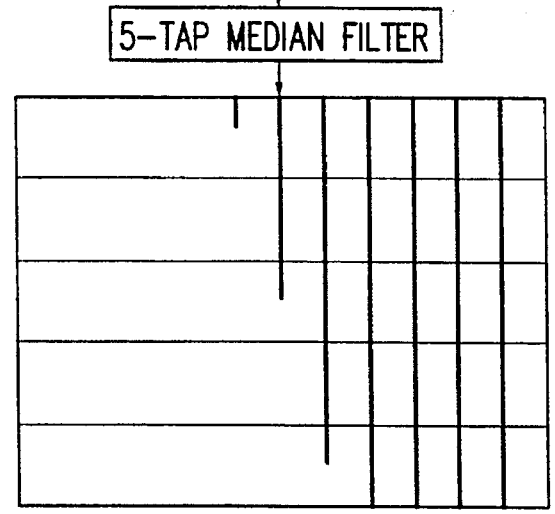

In a median filtering operation with five taps, the selectivity between full expansion or full compression can be improved, cf. FIGS. 9a and 9b. In FIG. 6, the three memories 35, 36, 37 for sorting the lines should then be replaced accordingly by five memories, each time with the capacitance of one-fifth of a frame. Another possibility for improving the selectivity is a repeated use of the filter structure shown in FIG. 6.

Figure 10:
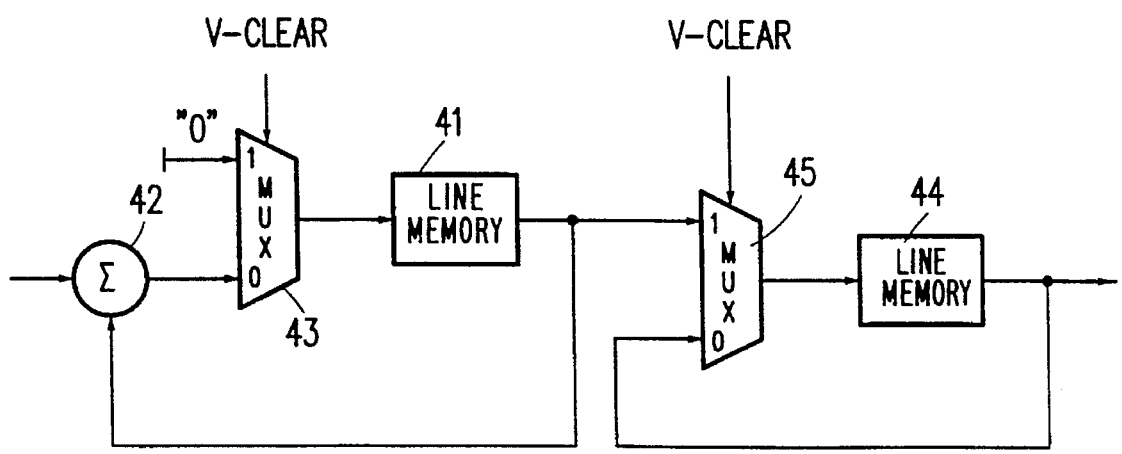
FIG. 10 shows the vertical integrator circuit occurring in FIG. 1.

After the horizontal high-pass filtering and the vertical low-pass filtering operations for extracting the scratch information, the mean value is now formed for all lines of a frame by means of the vertical integrator 9 shown in FIG. 10. Residual image information and superimposed noise can thereby be averaged out. An accumulator, comprising a line delay device 41 which is fed back to an input of a summing circuit 42 and whose other input conveys the output signal of the vertical low-pass filter 8 shown in FIG. 1, is set to zero by means of the pulse V-Clear (having the duration of one line) at the start of a frame via a multiplexer 43. The intermediate result of the integration is continually stored in the line memory 41 and transferred to a second line memory 44 at the end of a frame. A second multiplexer 45 causes the result of the accumulation to recirculate in the memory 44 for the duration of a frame, while the accumulator (41, 42, 43) is performing the next integration.

Figure 11:
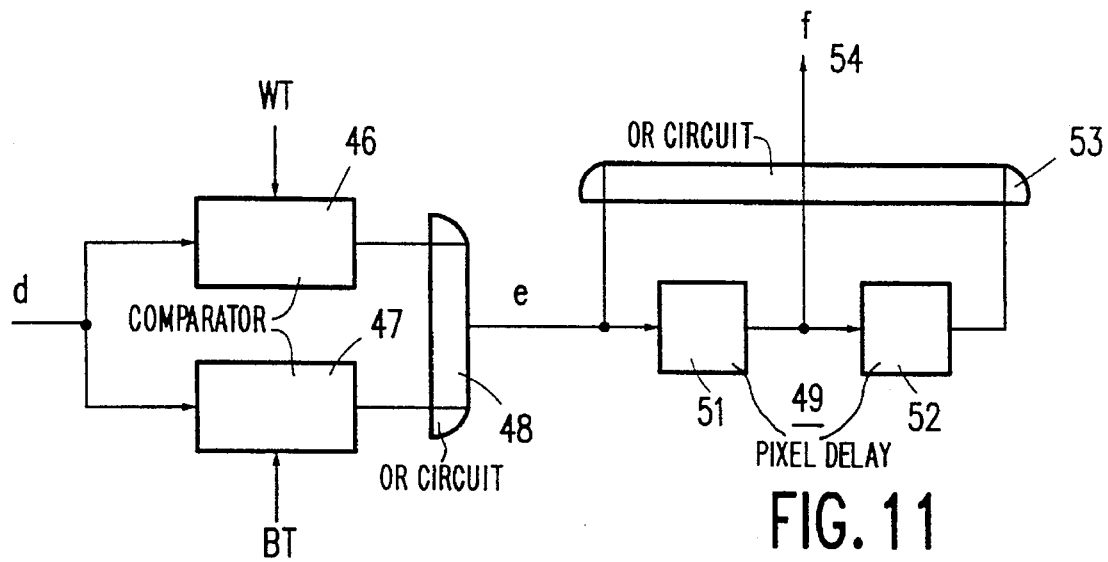
FIG. 11 shows the comparator and signal extension circuits of FIG. 1.

The output signal of the vertical integrator 9 is applied to a comparator circuit shown in FIG. 11. This comparator circuit comprises two comparators 46, 47, comparator 46 of which receives a positive threshold value WT for white scratches and comparator 47 receives a negative threshold value BT for black scratches. The two comparator signals are combined via an OR circuit 48 and applied to a subsequent signal extension circuit 49. This circuit comprises two pixel delay devices 51, 52 whose three taps are combined via a further OR circuit 53 so that the control signal derived from the scratch information for controlling the multiplexer 5 of FIG. 1 can be taken off output 54.

Figure 12:
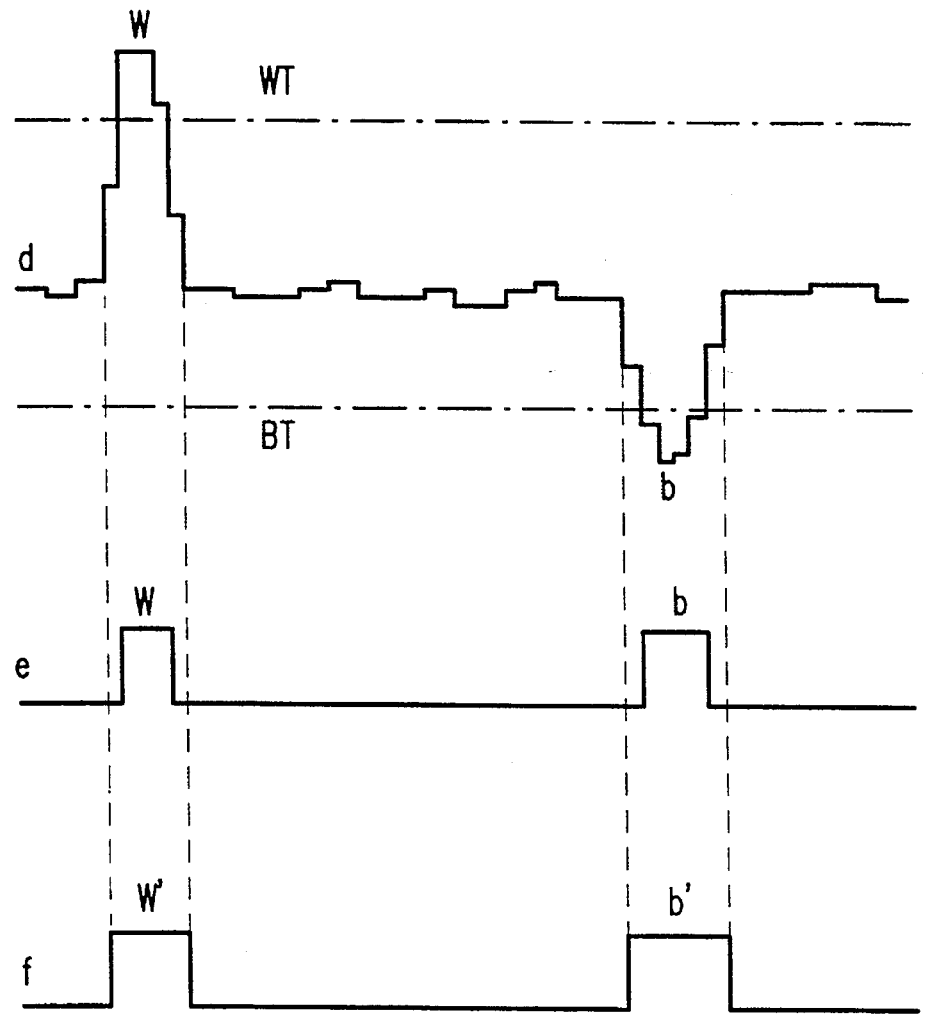
FIG. 12 shows time diagrams of the signals occurring in FIG. 11.

FIG. 12 shows the output signal d of the vertical integrator 9 with respect to time (one line). The signal mean value, which is around zero, has two peaks w and b which are caused by a white and a black scratch, respectively. These two peaks w and b are compared with the threshold values WT and BT in the comparators 46 and 47 and combined via the OR circuit 48 so that corresponding pulses e are produced at the output of the comparator.

This comparator output signal with the two pulses w and b is also applied to the signal extension circuit 49, while the pulses w' and b' thus extended can be taken off the output of this circuit as a control signal. Here it is readily evident that the bases of the scratch pulses are certainly detected by the control signal in this way. Without this extension circuit, the threshold values would have to be so low that there would be a risk of erroneous triggering due to residual image parts or noise at a small contrast of the scratches.

I claim:

1. A method of detecting and concealing video signal errors caused by vertically extending film scratches during television film scanning, said method comprising the steps:

deriving an error signal at error locations generated by disturbed pixels; and concealing the errors in the video signal using said error signal to form a control signal, characterized in that said deriving step comprises:

generating the error signal only when an adjustable, locally bounded scratch width in the horizontal direction is not exceeded and when each scratch essentially extends vertically, and when the scratch length substantially corresponds to the film frame height, and said concealing step comprises:

replacing the disturbed locations in the video signal with a corresponding low-pass-filtered video signal with the aid of the error signal.

2. A method as claimed in claim 1, characterized in that said replacing step comprises deriving the low-pass-filtered video signal by median filtering.

3. A method as claimed in claim 1, characterized in that said step of generating the error signal comprises checking a luminance signal, taken from the video signal, by median filtering for scratch width, by horizontal high-pass filtering for scratch shape, and by line sorting and vertical low-pass filtering for scratch length.

4. A method as claimed in claim 3, characterized in that said method further comprises:

deriving the control signal used for error concealment by signal extension in the horizontal direction from the error signal generated after horizontal high-pass filtering and vertical low-pass filtering.

5. A circuit for detecting and concealing video signal errors caused by vertically extending film scratches during television film scanning, characterized in that said circuit comprises:

a video signal input for receiving a video signal;

a horizontal low-pass circuit having an input coupled to said video signal input;

a delay circuit having an input also coupled to said video signal input;

a multiplexer having a first input coupled to an output of said horizontal low-pass circuit, and a second input coupled to an output of said delay circuit; and a control signal generating circuit having an input coupled to said video signal input, and an output carrying a control signal coupled to a control signal input of said multiplexer, wherein said control signal generating circuit comprises:

a horizontal high-pass filter having an input for receiving a luminance signal derived from the video signal;

a line sorter having an input coupled to an output of said horizontal high-pass filter;

a vertical low-pass filter having an input coupled to an output of said line sorter;

a vertical integrator having an input coupled to an output of said vertical low-pass filter;

a comparator circuit for white and black scratches having an input coupled to an output of said vertical integrator; and a signal extension circuit having an input coupled to an output of said comparator circuit, said signal extension circuit having an output coupled to the output of said control signal generating circuit which is, in turn, connected to the control input of the multiplexer.

6. A circuit as claimed in claim 5, characterized in that the horizontal low-pass circuit is a median filter having up to approximately nine pixel delay taps.

7. A circuit as claimed in claim 5, characterized in that the horizontal high-pass filter comprises:

a median filter having an input coupled to the input of said horizontal high-pass filter, said median filter having up to approximately five pixel taps;

a delay member having an input also coupled to the input of said horizontal high-pass filter, said delay member having a delay corresponding to a delay caused by said median filter; and a subtraction circuit having inputs coupled, respectively, to outputs of said median filter and said delay member, wherein a median-filtered signal from the median filter is subtracted from an unfiltered signal from the delay member.

8. A circuit as claimed in claim 5, characterized in that the line sorter comprises a plurality of memory blocks selectively coupled to an input of said line sorter, each of said memory blocks storing a corresponding part of a frame of the signal at the output of the horizontal low-pass circuit.

9. A circuit as claimed in claim 8, characterized in that the vertical low-pass filter comprises a median filter having a plurality of line delay taps corresponding, in number, to the plurality of memory blocks in said line sorter.

10. A circuit as claimed in claim 5, characterized in that the vertical integrator comprises;

an accumulator comprising a summing circuit having a first input coupled to the input of the vertical integrator, a first multiplexer having a first input coupled to an output of the summing circuit and a second input coupled to a "zero" reference, and a first line memory having an input coupled to an output of said first multiplexer, and an output coupled to a second input of said summing circuit;

a second multiplexer having a first input coupled to the output of said first line memory; and a second line memory having an input coupled to an output of said second multiplexer, and an output coupled to a second input of said second multiplexer, the output of said second line memory forming the output of said vertical integrator, whereby the first line memory effects an integration during a frame whose result is transferred to the second line memory in which it recirculates for the duration of a frame.

11. A circuit as claimed in claim 5, characterized in that the comparator circuit comprises:

a first comparator and a second comparator arranged in parallel to the input of said comparator circuit, said first comparator having a positive threshold value for white scratches, and said second comparator having a negative threshold value for black scratches; and an OR circuit having inputs coupled, respectively, to outputs of said first and second comparators, an output of said OR circuit forming the output of said comparator circuit.

12. A circuit as claimed in claim 5, characterized in that the signal extension circuit comprises:

a plurality of successively arranged pixel delay members; and an OR circuit having inputs coupled, respectively, to outputs and inputs of said pixel delay members, an output of said OR circuit being coupled to the output of said signal extension circuit for supplying an extended control signal.

* * * * *